United States Patent Office 3,102,123
Patented Aug. 27, 1963

---

3,102,123
ANALOGUES OF GRISEOFULVIN AND PROCESS BY WHICH THEY ARE PREPARED
Victor Malcolm Clark, Cambridge, Thomas Walker, Wembley, and Godfrey Basil Webb, Greenford, England, assignors to Glaxo Group Limited, Greenford, England, a British company
No Drawing. Filed May 1, 1961, Ser. No. 106,544
Claims priority, application Great Britain May 4, 1960
15 Claims. (Cl. 260—346.2)

This invention is concerned with the preparation of new analogues of griseofulvin.

Griseofulvin is an antifungal antibiotic which has recently achieved importance in the treatment of various fungal conditions in man and animals, the antibiotic in general being administered by internal administration, for example in the form of solid oral preparations such as tablets, capsules, etc., or liquid oral preparations such as suspensions, syrups etc. The antibiotic also finds use in agriculture and horticulture. Following the establishment of griseofulvin as a potent antifungal agent, considerable interest has arisen in the preparation of chemical analogues of griseofulvin with a view to finding other substances of improved therapeutic utility.

An objective of the present invention is to provide new methods for the synthesis of derivatives of griseofulvin, which derivatives are themselves useful by reason of their structure in the synthesis of a range of other griseofulvin analogues.

The new compounds produced according to the invention can be described as enol halides of grisan acids. Grisan acids have the skeletal structure

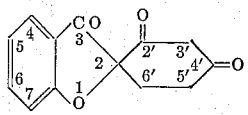

(I)

and their enol halides fall into two series which may be termed normal and iso enol halides. These possess the following skeletal structures

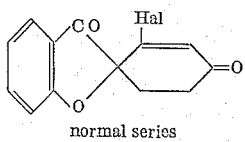 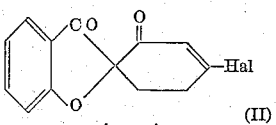

normal series      iso series    (II)

where Hal represents a halogen atom such as a bromine or, preferably, a chlorine atom.

The halogen atoms on the 2'- or 4'-positions of compounds of the above type have been found to be reactive with a number of compounds as more particularly described hereinafter, thus enabling a wide range of further compounds to be prepared.

The new enol halides may be prepared by reacting a grisan acid of skeletal Formula I with a halogenating agent of the kind which may be used to convert a carboxyl group (—COOH) to an acid halide group (COHal).

According to the present invention, therefore, there is provided a process for the preparation of enol halides of grisan acids in which grisan acids are reacted with a halogenating agent of the kind described above.

We have further found that while grisan acids which are unsubstituted at the 3'-position give rise to a mixture of both normal and iso enol halides, grisan acids which carry 3'-substituents lead only to the iso enol halides, the normal compounds being undetected in the reaction mixture. Substituents which have been found to be useful at the 3'-position, in leading to useful analogues of griseofulvin, include alkyl, alkenyl and aralkyl groups and halogen atoms, e.g. methyl, ethyl, propyl, isopropyl and benzyl groups and chlorine and bromine atoms. 3'-substituted grisan acids can be produced by the method described in applications Serial Nos. 106,545 and 106,546, both filed on May 1, 1961.

We have also observed that even when no substituent is present at the 3'-position, the course of the reaction is influenced by the presence of dimethyl formamide to produce the iso enol halide only, in especially high yield. Where it is desired to carry out the halogenation reaction of the invention in the presence of a solvent, therefore, and the desired product is a normal enol halide unsubstituted at the 3'-position, the solvent should be inert in the reaction, i.e. should not influence the product. Suitable inert solvents include, for example hydrocarbons such as benzene, toluene, etc., ketones such as acetone, methyl ethyl ketone etc. and esters such as ethyl acetate etc. It should be noted, however, that in reacting 3'-bromogriseofulvic acid with phosphorous oxychloride in acetone, bromine was found to be removed.

The preferred halogenating agents, however, are phosphorus oxyhalides such as phosphorus oxychloride and since these are liquid at room temperature they may be used in excess to provide a reaction medium, thus avoiding use of added solvents which may influence the reaction.

To obtain optimal yields the condition of the phosphorus oxychloride or phosphorus oxybromide is important, material containing much free hydrogen halide giving rise to decomposition, whilst freshly distilled material reacts slowly, again with some decomposition. We have found that best results are obtained with freshly distilled phosphorus oxyhalide, to which from 0.1 to 2.5% by volume of water, preferably 1%, has been added before use in the reaction.

Where the desired product is a 3'-unsubstituted normal or iso enol halide, the mixture of compounds produced by halogenation may be separated e.g. by chromatography, fractional crystallisation, use of Girard reagents etc. Thus, for example, the product of the foregoing reaction is then conveniently recovered, e.g. by extraction with an organic solvent e.g. chloroform, followed by washing with dilute alkali and water, and evaporation of the solvent. The mixture so obtained is then conveniently subjected to chromatography, for example, upon alumina. Suitable solvents for application of the product to the absorbent are hydrocarbon solvents such as benzene or toluene. Elution may, for example, be effected using a hydrocarbon solvent containing a minor proportion of a more polar solvent, mixtures of benzene containing ethyl acetate being very suitable. In general the 4'-halogen compound is eluted first, the 2'-halogen compound appearing as the second fraction.

The normal series of enol halides is especially useful in that the normal ethers and thioethers etc. which may be prepared from this generally possess greater physiological activity than the corresponding iso compounds. We have found that the yield of normal enol halide from a 3'-unsubstituted grisan acid may be improved by incorporating an alkali metal or alkaline earth metal halide into the reaction mixture. Lithium and magnesium halides are especially effective, the chlorides being preferred where enol chloride formation is desired. Thus, for example when griseofulvic acid is reacted with phosphorus oxychloride, addition of lithium chloride to the reaction mixture together with a little water gives 60% of the normal enol chloride and 40% of the iso enol chloride as measured by the infra red spectra. The quantity of the normal enol chloride finally isolated by reaction with Girard P reagent amounts to 50% of theoretical whereas in the absence of lithium chloride, only 25% of each enol halide was obtained. Magnesium chloride gives rise to similar high yields.

The use of such inorganic halides also has the effect of improving the yield and facilitating the working up of the iso-enol halides as well as the normal enol halides and alkali metal and alkaline earth metal and alkaline earth metal halides are preferred additives in the conversion of 3′-substituted grisan acids to the iso-enol halides. In general, however, where dimethyl formamide is used as solvent, the yield of iso-enol halide is especially high and is not improved by addition of, for example, lithium chloride.

In order to produce enol halides, and hence other griseofulvin analogues, having varying substitution, the grisan acids used as starting material may carry such substituents as, for example, alkyl, alkenyl, aryl, aralkyl, alkenoxy, aralkoxy and aryloxy groups and halogen atoms. Thus, for example, methyl, ethyl, propyl, isopropyl, allyl, benzyl, phenyl methoxy, ethoxy, propoxy, iso-propoxy, allyloxy or benzyloxy groups or chlorine or bromine atoms may be present. In order to produce enol halides of use in producing the closer analogues of griseofulvin, the grisan acids preferably carry a methyl group in the 6′-position, a chlorine atom in the 7-position, an alkoxy, alkenoxy, aralkoxy or aryloxy group in the 4- and 6-positions and only hydrogen atoms in the 5- and 5′-positions. Methods of varying the nature of the 4- and 6-position substituents have been described in co-pending applications Nos. 79,553, filed December 30, 1960, and 88,647, filed February 13, 1961, now abandoned. Where alkyl, alkenyl, alkoxy and alkenoxy groups are present, these are preferably lower alkyl or alkenyl substituents for example having 1 to 5 carbon atoms.

As indicated above, the enol halides may be used to form griseofulvin analogues by reaction with appropriate compounds. Thus, for example, reaction with alcohols, thiols and amines gives rise to ethers, thioethers and amines.

According to a further feature of the present invention, therefore, we provide a process for the preparation of compounds of the skeletal formula

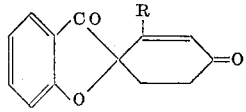

or

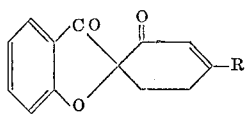

in which R represents an alkoxy, alkenoxy, aralkoxy, aryloxy, alkylthio, alkenylthio, aralkylthio, arylthio, or primary, secondary or tertiary amino group in which an enol halide as according to the invention is reacted with a compound RH where R has the above meaning.

The compound RH may thus, for example, be methanol, ethanol, propanol, benzyl, alcohol, methyl, ethyl, propyl, benzyl or phenyl mercaptan, methylamine, ethylamine, ethanolamine, aniline, dimethylamine, morpholine, piperidine, pyrrolidine, methyl aniline or diethanolamine. This reaction can be conveniently carried out in the presence of an acid binding agent for example an alkali metal or alkaline earth metal carbonate or bicarbonate e.g. sodium or potassium carbonate or bicarbonate or a tertiary organic base, e.g. triethylamine, pyridine, dimethylaniline, N-methylmorpholine etc. The reaction is conveniently carried out in a solvent medium which may be constituted e.g. in the case of the lower alcohols, by the compound RH itself. Other solvents which can be used include acetone, methyl ethyl ketone etc. The reaction is conveniently effected by heating, for example at the boiling point of the reaction medium.

We have found that certain thio and aryloxy analogues of griseofulvin in the normal series posses greater activity against a number of plant pathogens than griseofulvin itself. According to the present invention therefore we provide compounds of the general formula

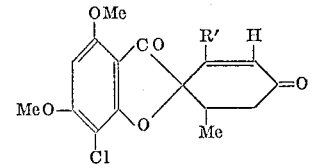

where R′ represents an alkylthio, alkenylthio, aralkylthio, arylthio or aryloxy group. R′ is preferably a methylthio, ethylthio, propylthio, butylthio, allylthio, benzylthio, phenylthio or phenoxy group.

For the better understanding of the invention the following examples are given only as illustrations:

EXAMPLE 1

*Preparation of 7,2′-Dichloro-4,6-Dimethoxy-6′-Methylgris-2′-ene-3,4′-Dione (IIA) and 7,4′-Dichloro-4,6-Dimethoxy-6′-Methylgris-3′-ene-3,2′-Dione (IIB)*

Phosphorus oxychloride was redistilled at atmospheric pressure and the fraction, B.P. 105–8° C., collected. To 100 ml. of freshly distilled material was added 1.0 ml. water and the mixture shaken at room temperature until all reaction was finished. Finely powdered griseofulvic acid (17.0 g.) was added and the mixture heated on the steam bath for a total of 20 mins. (all solid had gone into solution after approx. 7 min.). The reaction mixture was cooled, and most of the phosphorus oxychloride removed in vacuo. The gummy residue was dissolved in chloroform, and washed with water, 2 N sodium carbonate solution, and water. The chloroform extract was dried over magnesium sulphate and evaporated to dryness. The solid residue (14.0 g.) was dissolved in benzene and chromatographed on neutral alumina (500 g.). Elution with 5% ethyl acetate/benzene gave first the iso-chloro compound (IIB) which after crystallisation from acetic acid weighed 4.8 g. (27.0%), M.P. 248–250° C., $[\alpha]_D^{20°\,C.} = +278°$ (c.=1.0 acetone).

(Found: C, 53.4; H, 3.95; Cl, 19.5. $C_{16}H_{14}Cl_2O_5$ requires C, 53.8; H, 3.95; Cl, 19.85%.)

Further elution with 5% ethyl acetate/benzene followed by 20% ethyl acetate/benzene gave (IIA) which after crystallisation from carbon tetrachloride and drying at 100° in vacuo weighed 4.3 g. (24.0%), M.P. 198–200° C., $[\alpha]_D^{20°\,C.}$ +370 (c.=1.0 acetone). (Found: C, 53.95; H, 4.0; Cl, 19.5. $C_{16}H_{14}Cl_2O_5$ requires C, 53.8; H, 3.95; Cl, 19.85%.)

EXAMPLE 2

Water (1 ml.) was added to freshly distilled phosphorus oxychloride (100 ml.) followed by anhydrous lithium chloride (17 g.) and griseofulvic acid (17 g.). The mixture was heated on the steam bath for 20 minutes and the excess of phosphorus oxychloride removed in vacuo. Water (200 ml.) was added slowly to the residue, keeping temperature below 20°. After stirring for 1 hour the solution was filtered and the solid washed with water, sodium bicarbonate solution and water. After drying over silica gel the product weighed 17.7 g., M.P. 201–212°, $[\alpha]_D^{20}$ +334.5° (c., 1 in acetone).

5 g. of this product was dissolved in ethanol (50 ml.) and acetic acid 5 ml. containing Girard P (2.1 g.). The solution was refluxed for 15 minutes, cooled and poured into aqueous sodium bicarbonate soltion (10 g. in 300 ml.). Extraction with ethyl acetate gave the non Girard fraction 7,4′-dichloro-4,6-dimethoxy-6′-methylgris-3′-en-3,2′-dione. The aqueous solution was acidified with 2 N sulphuric acid (200 ml.) and stirred with 400 ml. of ethyl acetate for 4 hours. The ethyl acetate layer was washed with water, sodium bicarbonate solution and water, dried (MgSO4) and evaporated to give 7,2′-dichloro-4,6-dimethoxy-6′-methylgris-2′-en-3,4′-dione (2.4 g.).

EXAMPLE 3

A mixture of griseofulvic acid (0.85 g.), magnesium chloride (1.4 g.) and phosphorus oxychloride (5.0 ml.) was heated on the steam bath for 20 minutes. Working up in the usual way gave the mixed enol chlorides, containing 60% of the desired normal form.

EXAMPLE 4

A mixture of griseofulvic acid (3.4 g.), lithium chloride (3.4 g.) phosphorus oxychloride (4 ml.) in toluene (17 ml.) was stirred and heated on the steam bath for 3 hours. The solvent was removed in vacuo, water and ethyl acetate added to the residue and the organic layer washed with water, sodium bicarbonate solution and water. Unchanged griseofulvic acid (0.58 g.) was recovered from the alkaline layer by acidification. The ethyl acetate layer on evaporation gave the mixed enol chlorides (2.95 g.). Separation with Girard P as in Example 2 gave 7,2' - dichloro - 4,6 - dimethoxy - 6' - methylgris-2'-en-3,4'-dione (1.63 g.).

EXAMPLE 5

A mixtures of griseofulvic acid (1.7 g.), lithium chloride (1.7 g.), phosphorus oxychloride (2 ml.) and acetone (10 ml.) was refluxed for 20 minutes. After working up in the usual way unchanged griseofulvic acid (0.55 g.) was recovered from the alkaline wash, and the neutral extract gave 1.1 g. of mixed enol chlorides, containing 70% of the normal isomer.

EXAMPLE 6

*The Preparation of 3'-Bromo-7,4'-Dichloro-4,6-Dimethoxy-6'-Methylgris-3'-En-3,2'-Dione*

A mixture of 3'-bromogriseofulvic acid (4.18 g.) and phosphorus oxychloride (60 ml.) (to which 0.6 ml. of water had been previously added) was refluxed for 1 hour. Evaporation in vacuo gave the residue which was taken up in chloroform and washed with water, sodium bicarbonate solution and water. Evaporation of the chloroform layer and crystallisation of the residue from acetic acid gave the enol chloride identical with an authentic specimen, M.P. 213–216°, $[\alpha]_D$ +212° (c., 1.0 acetone). Found: C, 44.15; H, 2.96. 7.634 mg. gave 7.958 mg. AgHal. $C_{16}H_{13}BrCl_2O_5$ requires C, 44.0; H, 3.0. 7.634 mg. should give 8.30 mg. AgHal.

EXAMPLE 7

A mixture of 3'-bromogriseofulvic acid (2.08 g.), lithium chloride (1.7 g.) and phosphorus oxychloride (10 ml.) (to which water (0.1 ml.) had been previously added) was refluxed for 25 minutes. Working up in the usual way gave the iso-enol chloride (2.3 g.) identical with the specimen prepared in Example 6.

EXAMPLE 8

A mixture of 3'-bromogriseofulvic acid (2.08 g.), lithium chloride (1.7 g.), phosphorus oxychloride (4.0 ml.) and toluene (16 ml.) was refluxed for 1 hour. After working up in the usual way the neutral layer gave the iso-enol chloride (0.7 g.) identical with the specimen described in Example 6.

EXAMPLE 9

*Preparation of 3'-Benzyl-7,4'-Dichloro-4,6-Dimethoxy-6'-Methylgris-3'-En-3,2'-Dione*

A mixture of 3'-benzylgriseofulvin acid (2.14 g.) and phosphorus oxychloride (10 ml.) (containing 0.1 ml. water) was heated on the steam bath for 12 minutes. After working up in the usual way the neutral product was recrystallised from isopropyl alcohol to give the enol chloride, M.P. 170.5–171.5°. (Found: C, 61.72; H, 4.42; Cl, 15.93. $C_{23}H_{20}O_5Cl_2$ requires C, 61.75; H, 4.51; Cl, 15.85%.)

EXAMPLE 10

*Preparation of 7,4'-Dichloro-4,6-Dimethoxy-6'-Methylgris-3'-En-3,2'-Dione*

Phosphorus oxychloride (2.0 ml.) was added slowly to a solution of griseofulvic acid (1.7 g.) in dimethylformamide (20 ml.), and the mixture allowed to stand at room temperature for 1 hour. Water (100 ml.) was added slowly and the crystalline solid filtered, washed with water and dried to give 7,4'-dichloro-4,6-dimethoxy-6'-methylgris-3'-en-3,2'-dione (1.75 g.).

EXAMPLE 11

*Preparation of 7,4'-Dichloro-4,6-Dimethoxy-6'-Methylgris-3'-En-3,2'-Dione*

Griseofulvic acid (17 g.) was dissolved in dimethylformamide (200 ml.) containing anhydrous lithium chloride (5 g.) and phosphorus oxychloride (20 ml.) was added slowly with cooling. After standing at room temperature for 1 hour the reaction mixture was worked up as in Example 10 to give 7,4'-dichloro-4,6-dimethoxy-6'-methylgris-3'-en-3,2'-dione (17.22 g.).

EXAMPLE 12

*Preparation of 3'-Bromo-7,4'-Dichloro-4,6-Dimethoxy-6'-Methylgris-3'-en-3,2'-Dione*

3'-bromogriseofulvic acid (2.0 g.) was dissolved in dimethylformamide (15 ml.) and phosphorus oxychloride (2.0 ml.) was added slowly with cooling. After 40 min. at room temperature water was added to the reaction mixture with cooling, and the crystalline solid which separated was filtered, washed with water and dried to give the crude product (2.0 g.). Crystallisation from acetic acid gave the pure enol chloride, M.P. 213–216°, $[\alpha]_D^{20}$ +212° (c., 0.7 in acetone). (Found: C, 44.15; H, 2.96. $C_{16}H_{14}O_5Cl_2Br$ requires C, 43.97; H, 3.2%.)

EXAMPLE 13

*Preparation of 7,3',4'-Trichloro-4,6-Dimethoxy-6'-Methylgris-3'-en-3,2'-Dione*

3'-chlorogriseofulvic acid (1.87 g.) was dissolved in dimethylformamide (20 ml.) and phosphorus oxychloride (2 ml.) added slowly with cooling. After 30 minutes at room temperature water was added to the reaction mixture with cooling, and the yellow solid which precipitated was filtered, washed with water and dried. Crystallisation from acetic acid gave the pure enol chloride, M.P. 235.5–237.5° C., $[\alpha]_D$ +258° (c., 1.0 acetone). (Found: C, 49.5; H, 3.4; Cl, 27.2. $C_{16}H_{13}Cl_3O_5$ requires C, 49.1; H, 3.35; Cl, 27.15%.)

EXAMPLE 14

*Reactions With 7,2'-Dichloro-4,6-Dimethoxy-6'-Methylgris-2'-ene-3,4'-Dione (IIA)*

(a) *With methanol.*—The chloro compound IIA (0.36 g.) was dissolved in hot methanol (14.0 ml.) and 1.8 ml. 2 N $Na_2CO_3$ solution, and 5.4 ml. water added. The mixture was refluxed for 5 minutes, cooled, and the solvent removed in vacuo. The solid residue was triturated with water, filtered, washed with water and dried in vacuo to give griseofulvin (0.3 g.), M.P. 218–22° C. (no depression with authentic specimen), $[\alpha]_D^{20°}$ c. +330° (c.=1.0 acetone).

(b) *With ethanol.*—A solution of the chloro compound IIA (1.0 g.) in absolute ethanol (30 ml.) containing suspended anhydrous potassium carbonate (1.0 g.) was stirred and refluxed for 45 mins. The mixture was evaporated to dryness, and the residue treated with ethyl acetate and water. The organic layer was washed twice with water, dried over magnesium sulphate. The residue obtained on evaporation of the solvent was crystallised from ethanol to give 7-chloro-4,6-dimethoxy-2'-ethoxy - 6' - methylgris - 2' - ene - 3,4' - dione (0.4 g.), M.P. 203–6° C., $[\alpha]_D^{20°\ C.}$ +317° (c.=1.0 acetone) (Grove et al., J.C.S., 1952, 3983, give M.P. 205–6°, $[\alpha]_D^{20°\ C.}$ +316° (c.=0.98 acetone).

EXAMPLE 15

*Reactions With 7,4'-Dichloro-4,6-Dimethoxy-6'-Methylgris-3'-ene-3,2'-Dione (IIB)*

(a) *With methanol.*—A solution of the chloro compound IIB (0.36 g.) in acetone (10 ml.) and methanol (5.0 ml.) was stirred with anhydrous potassium carbonate (0.25 g.) at room temperature for 30 mins. The solvents were evaporated, and the residue treated with ethyl acetate and water. The organic layer was washed with water, dried over magnesium sulphate and evaporated to dryness. The residue was triturated with ether, and the solid filtered to give substantially pure isogriseofulvin (0.16 g.), M.P. 197–199° C. The structure was confirmed by comparison of infra-red spectra.

(b) *With phenol.*—A solution of the chloro compound IIB (0.36 g.) in methyl ethyl ketone (10 ml.) containing phenol (0.15 g.) was stirred and refluxed with anhydrous potassium carbonate (0.5 g.) for 1 hr. The solvent was removed in vacuo, the residue treated with ethyl acetate and water, the organic layer washed with water, dried over magnesium sulphate and evaporated. Crystallisation of the residue from ether gave 7-chloro-4,6-dimethoxy - 6' - methyl - 4' - phenoxygris - 3' - ene - 3,2' - dione (0.3 g.), M.P. 206–8° C. Crystallisation from ethanol gave long needles of the pure sample, M.P. 206.5–9° C., $[\alpha]_D^{20°\ C.}$ +93.5° (c.=acetone). Found: C, 63.2; H, 4.7; Cl, 8.58. $C_{22}H_{19}O_6Cl$ requires C, 63.7; H, 4.6; Cl, 8.6%.)

EXAMPLE 16

*7-Chloro-4,6-Dimethoxy-6'-Methyl-2'-Phenoxygris-2'-en-3,4'-Dione*

(a) A solution of sodium phenoxide (174 mg.; 1.5 mmoles) (prepared by the method of Kornblum et al. J. Amer. Chem. Soc. 1959, 81, 2705), in diethyleneglycol dimethyl ether (2.0 ml.) was mixed with a solution of 7,2' - dichloro - 4,6 - dimethoxy - 6' - methylgris - 2' - en-3,4'-dione (350 mg.; 1.0 mmoles) in the same solvent (1.5 ml.) and the mixture heated on the steam bath for 20 mins. The mixture was cloudy rapidly and an appreciable amount of solid was deposited at the end of the heating period. The cooled mixture was diluted with ethyl acetate and washed with dilute sodium hydroxide solution and then four times with water. The organic phase was dried with magnesium sulphate and evaporated to dryness under reduced pressure to give 7-chloro-4,6 - dimethoxy - 6' - methyl - 2' - phenoxygris - 2' - en-3,4'-dione (420 mg.) as a gum.

(b) Sodium phenoxide (0.35 g.; 3 mmoles) was added to a solution of 7,2'-dichloro-4,6-dimethoxy-6'-methylgris-2'-en-3,4'-dione (0.70 g.; 2 mmoles) in dry acetone (10 ml.). The solution became cloudy very rapidly and after ½ hr. at room temperature was evaporated to dryness under reduced pressure. The product was collected and washed as described above and the solution in ethyl acetate was passed through a column of activated alumina (20 g.) and then evaporated to dryness to give 7-chloro-4,6 - dimethoxy-6'-methyl-2'-phenoxygris-2'-en-3,4'-dione (0.70 g.) as a white froth which could not be crystallised, but gave the expected infra-red spectrum.

EXAMPLE 17

*7-Chloro-4,6-Dimethoxy-6'-Methyl-2'-Thiophenylgris-2'-En-3,4'-Dione*

A mixture of 7,2'dichloro-4,6-dimethoxy-6'-methylgris-2'-en-3,4'-dione (0.35 g.), thiophenol (0.2 ml.), anhydrous potassium carbonate (0.50 g.) and acetone (10 ml.) was stirred and refluxed for ½ hr. The acetone was removed under reduced pressure and the residue dissolved in ethyl acetate and water. The organic phase was washed twice with 2 N sodium hydroxide and then twice with water, back extracting the washes with ethyl acetate. The combined organic phases were dried over magnesium sulphate and freed from any residual thiophenol by passage through a column of activated alumina (ca. 20 g.). Evaporation of the solvent followed by evaporation with dry ether gave 7-chloro-4,6-dimethoxy-6'-methyl-2'-thiophenylgris-2'-en-3,4'-dione (0.32 g.) as a white froth which could not be crystallised but having the expected infra-red spectrum.

EXAMPLE 18

*7-Chloro-4,6-Dimethoxy-6'-Methyl-4'-Thiophenylgris-3'-En-3,2'-Dione*

7,4'-dichloro-4,6-dimethoxy - 6' - methylgris-3'-en-3,2'-dione (1.0 g.) was dissolved in warm dry acetone (50 ml.) and cooled to room temperature. Thiophenol (0.60 ml.), and triethylamine (0.80 ml.) were added causing a practically instantaneous precipitation of triethylamine hydrochloride. After 10 min. the solid was filtered off, washed with a little acetone and discarded. The filtrate was evaporated to dryness and the residue in ethyl acetate washed with sodium hydroxide solution and water (backwashing). Evaporation of the dried (magnesium sulphate) solution gave a crude product (ca. 1.2 g.) which was crystallised twice from nitromethane to give pure 7-chloro-4,6-dimethoxy - 6' - methyl-4'-thiophenylgris-3'-en-3,2'-dione (0.45 g.) as fine needles, double M.P. 230° and 234–6°. Found: C, 61.03; H, 4.63; S, 7.38. $C_{22}H_{19}O_5ClS$ requires C, 61.32; H, 4.41; S, 7.42%.

EXAMPLE 19

*7-Chloro-4,6-Dimethoxy-6'-Methyl-2'-Thiobenzylgris-2'-En-3,4'-Dione*

Benzylmercaptan (0.60 ml.) and triethylamine (0.80 ml.) were added to a solution of 7,2'-dichloro-4,6-dimethoxy-6'-methylgris-2'-en-3,4'-dione (1.0 g.) in acetone (25 ml.). After standing overnight at room temperature the crystals of triethylamine hydrochloride were filtered off and washed with a little acetone. The filtrate was evaporated to dryness under reduced pressure and the residue in ethyl acetate washed with sodium hydroxide solution and water (backwashing). Evaporation of the dried (magnesium sulphate) solution gave a somewhat sticky solid residue which was triturated with dry ether, then filtered and washed with dry ether (1.11 g., M.P. 207–10°). Crystallisation from ethyl acetate gave pure 7-chloro-4,6-dimethoxy - 6' - methyl-2'-thiobenzylgris-2'-en-3,4'-dione (0.75 g.), M.P. 210–2°. Found: C, 61.91; H, 4.81; Cl, 7.94. $C_{23}H_{21}O_5ClS$ requires C, 62.08; H, 4.76; Cl, 7.97%.

EXAMPLE 20

*7-Chloro-4,6-Dimethoxy-6'-Methyl-4'-Thiobenzylgris-3'-en-3,2'-Dione*

7,4'-dichloro-4,6-dimethoxy-6'-methylgris - 3' - en - 3,2'-dione (1.0 g.) was dissolved in warm acetone (50 ml.) and cooled to room temperature. Benzyl mercaptan (0.6 ml.) and triethylamine (0.8 ml.) were added. Triethylamine hydrochloride started to separate within about 5 mins. After 24 hr. at room temperature the triethylamine hydrochloride was filtered off and washed with a little acetone. The filtrate was evaporated to dryness under reduced pressure and the residue in ethyl acetate washed with sodium hydroxide solution and water. Evaporation of the dried (magnesium sulphate) solution gave a gum (1.5 g.) which failed to crystallise on standing in ether. A sample in warm isopropanol deposited an amorphous solid which crystallised on trituration with ether, and sending the bulk of material in isopropanol gave the crude product as fluffy needles (0.78 g.), M.P. 143–8°. Recrystallisation from hot methanol (15 ml.) game pure 7-chloro-4,6-dimethoxy - 6' - methyl - 4' - thiobenzylgris - 3' - en - 3,2' - dione (0.50 g.), M.P. 145–7.5°.

Found: C, 61.79; H, 4.80; Cl, 7.98. $C_{23}H_{21}O_5ClS$ requires C, 62.08; H, 4.76; Cl, 7.97%.

EXAMPLE 21

*7-Chloro-4,6-Dimethoxy-6'-Methyl-2'-(β-Diethylamino)-Thioethylgris-2'-en-3,4'-Dione Hydrochloride*

A solution of β-diethylaminoethanethiol (0.45 g.) in dry acetone (30 ml.) was mixed with a solution of 7,2'-dichloro-4,6-dimethoxy-6'-methylgris-2'-en-3,4'-dione (1.08 g.) in dry acetone (30 ml.). Triethylamine (0.84 ml.) was added and the mixture stored at room temperature for 24 hr. The triethylamine hydrochloride was filtered off and washed with a little acetone and the filtrate evaporated to dryness in vacuo. The residue in ethyl acetate was washed with water, sodium carbonate solution and water, dried (magnesium sulphate) and evaporated to dryness. The residual froth crystallised on trituration with ether (0.83 g.), M.P. 133.5–135.5°. The base was dissolved in warm ethanol (12 ml.) and treated with a slight excess of saturated solution of hydrogen chloride in ethanol. The crystals (0.71 g.), M.P. 222–3° (dec.), which separated recrystallised from ethanol gave pure 7-chloro-4,6-dimethoxy-6'-methyl - 2' - (β - diethylamino) thioethylgris - 2' - en - 3,4' - dione hydrochloride (0.45 g.), M.P. 231–3° (dec.). Found: C, 54.26; H, 6.24; Cl. 14.45. $C_{22}H_{29}O_5NCl_2S$ requires C, 53.87; H, 5.96; Cl, 14.46%.

EXAMPLE 22

*7-Chloro-4,6-Dimethoxy-6'-Methyl-2'-Thioethylgris-2'-en-3,4'-Dione*

A solution of 7,2'-dichloro-4,6-dimethoxy - 6' - methylgris-2'-en-3,4'-dione (0.72 g.), ethanethiol (0.30 ml.) and triethylamine (0.70 ml.) in dry acetone (20 ml.) was stored at room temperature for 40 hr. Long needles of triethylamine hydrochloride had separated after 16 hr. The mixture was evaporated to dryness under reduced pressure and the residue dissolved in ethyl acetate and water. The organic phase was separated and washed successively with water, normal hydrochloric acid, water, normal sodium carbonate solution and water (backwashing all washes). Evaporation of the dried (magnesium sulphate) solution followed by evaporation with dry ether gave a crude somewhat sticky solid (0.82 g.). Trituration with ether gave a solid (0.50 g.), M.P. 172–9°, which when crystallised twice from ethanol gave pure 7-chloro-4,6-dimethoxy-6'-methyl-2'-thioethylgris-2'-en - 3,4'-dione (207 mg.), M.P. 185–7°, having the expected infra-red spectrum, $[\alpha]_D$ +475° (c., 1.0 acetone). (Found: C, 56.5; H, 5.1; Cl, 9.3; S, 8.3. $C_{18}H_{19}ClO_5S$ requires C, 56.45; H, 5.0; Cl, 9.3; S, 8.4%.)

EXAMPLE 23

*7-Chloro-4,6-Dimethoxy-6'-Methyl-4'-Thioethylgris-3'-en-3,2'-Dione*

7,4'-dichloro-4,6-dimethoxy-6'-methylgris - 3' - en - 3,2'-dione (0.36 g.) was dissolved in warm dry acetone (20 ml.) and cooled to room temperature. Ethanethiol (0.15 ml.) and triethylamine (0.35 ml.) were added and the mixture stored at room temperature for 15 hr. The triethylamine hydrochloride was filtered off and washed with a little acetone, and the filtrate evaporated to dryness under reduced pressure. The product was collected in ethyl acetate washing with dilute hydrochloride acid, water, sodium carbonate solution and water. Evaporation of the ethyl acetate solution followed by evaporation with dry ether gave a froth (0.38 g.) which soon crystallised on trituration with ether (0.29 g.), M.P. 172.5–176.5°. Crystallisation from ethanol (10 ml.) gave pure 7-chloro-4,6-dimethoxy-6'-methyl-4' - thioethylgris - 3'-en-3,2'-dione as long needles (208 mg.), M.P. 177–9°, $[\alpha]_D^{20}$ +236° (c., 1.0 in acetone). Found: C, 56.40; H, 4.95; Cl, 9.35. $C_{18}H_{19}O_5ClS$ requires C, 56.45; H, 5.00; Cl, 9.26%.

EXAMPLE 24

*7-Chloro-4,6-Dimethoxy-6'-Methyl-2'-Thiomethylgris-2'En-3,4'Dione*

Methanethiol (ca. 1.0 g.) and triethylamine (1.05 ml.) were added to a solution of 7,2'-dichloro-4,6-dimethoxy-6'-methylgris-2'-en-3,4'-dione (1.08 g.) in dry acetone (50 ml.). After 40 hrs. at room temperature the mixture which contained long needles of triethylamine hydrochloride was evaporated to dryness under reduced pressure. The residue in chloroform was washed successively with water, dilute hydrochloric acid, water, sodium carbonate solution and water. Evaporation of the dried (magnesium sulphate) chloroform solution gave a solid which was triturated and washed with ether (1.06 g.), M.P. 243.5–8°. Crystallisation from nitromethane gave pure 7-chloro-4,6-dimethoxy-6'-methyl-2'-thiomethylgris-2'-en-3,4'-dione (0.71 g.), M.P. 251–3° $[\alpha]_D$ +500° (c., 1.0 acetone). (Found: C, 55.08; H, 4.54; Cl, 9.79. $C_{17}H_{17}O_5ClS$ requires C, 55.36; H, 4.65; Cl, 9.61%.)

EXAMPLE 25

*7-Chloro-4,6-Dimethoxy-6'-Methyl-2'-Thioallylgris-2'En-3,4'Dione*

A solution of 7,2'-dichloro-4,6-dimethoxy-6'-methylgris-2'-en-3,4'-dione (1.08 g.), allylmercaptan (0.50 ml.) and triethylamine (1.05 ml.) in dry acetone (30 ml.) was stored at room temperature for 16 hours. The mixture (containing much triethylamine hydrochloride) was evaporated to dryness under reduced pressure and the residue in ethyl acetate washed with water, dilutehydrochloric acid, water, dilute sodium carbonate solution and water. Evaporation of the dried ethyl acetate solution gave a solid (1.21 g.) which was triturated and washed with ether (0.94 g.), M.P. 150–1.5°. Crystallisation from ethanol (15 ml.) gave pure 7-chloro-4,6-dimethoxy-6'-methyl-2'-thioallylgris-2'-en-3,4'-dione (0.71 g.), M.P. 153–4°, $[\alpha]_D$ +443° (c., 1.0 acetone). Found: C, 57.68; H, 4.79; Cl, 9.28; $C_{19}H_{19}O_5ClS$ requires C, 57.78; H, 4.85; Cl, 8.98%.

EXAMPLE 26

*7-Chloro-4,6-Dimethoxy-6'-Methyl-2'-Thiopropylgris-2'En-3,4'Dione*

A solution of 7,2'-dichloro-4,6-dimethoxy-6'-methylgris-2'-en-3,4'-dione (1.08 g.), n-propyl mercaptan (0.5 ml.) and triethylamine (1.05 ml.) in dry acetone (50 ml.) was refluxed for 24 hours, and then stood at room temperature for 24 hours. The reaction mixture was evaporated to small bulk, ethyl acetate and water added, and the organic phase washed with water, dilute hydrochloric acid, water, sodium carbonate solution and water. The dried (magnesium sulphate) organic phase was evaporated to dryness, and the residue in benzene chromatographed on alumina. Later fractions were combined, evaporated to dryness, and the residue crystallised from ethanol to give 7-chloro-4,6-dimethoxy-6'-methyl-2'-thiopropylgris-2'-en-3,4'-dione, M.P. 164–6°, M.P. 166.5–168°, $[\alpha]_D$ +459° (c., 1.0 acetone). (Found: C, 57.8; H, 5.3; Cl, 9.0. $C_{19}H_{21}ClO_5S$ requires C, 57.5; H, 5.3; Cl, 8.9%.)

EXAMPLE 27

*7-Chloro-4,6-Dimethoxy-6'-Methyl-2'-Thiobutylgris-2'En-3,4'Dione*

A solution of 7,2'-dichloro-4,6-dimethoxy-6'-methylgris-2'-en-3,4'-dione (1.08 g.), n-butyl mercaptan (0.6 ml.), and triethylamine (1.05 ml.) in dry acetone (50 ml.) was refluxed for 24 hours and then stood at room temperature for 24 hours. The reaction mixture was worked up exactly as for the propyl analogue, and the residue chromatographed on alumina in benzene. Elution with 5% ethyl acetate/benzene gave a little unchanged starting material, then 10% ethyl acetate/benzene gave 7-chloro-4,6-dimethoxy-6'-methyl-2'-thiobutylgris-2′-en-3,4′-dione, crystallised from ethanol, M.P. 154.5–6.5°, [α]$_D$ +429° (c., 1.0 acetone). (Found: C, 58.6; H, 5.95; Cl, 8.6. $C_{20}H_{23}ClO_5$ requires C, 58.5; H, 5.65; Cl, 8.6%.)

EXAMPLE 28

*7-Chloro-4,6-Dimethoxy-6′-Methyl-4′-Piperidinogris-3′En-3,2′-Dione*

The 4′-enol chloride (5 g.) in piperidine (50 ml.) was allowed to stand at room temperature overnight. The reaction mixture was poured into 2N-HCl (250 ml.) and the resulting buff solid was isolated by filtration. Extraction of the filtrate with ethyl acetate gave further material bringing the total crude yield to 5.5 g. Two crystallisations from ethanol gave the 4′-piperidino-compound (4.4 g., 77%), M.P. 185–190°, [α]$_D$ +415° (c., 1.0 in acetone). (Found: C, 61.9; H, 6.05; N, 3.1; Cl, 8.6. $C_{21}H_{24}ClNO_5$ requires C, 62.15; H, 5.9; N, 3.45; Cl, 8.75%.)

EXAMPLE 29

*7 - Chloro - 4,6 - Dimethoxy - 6′ - Methyl - 4′ - Pyrolidinogris - 3′ - En - 3,2′ - Dione*

The 4′-enol chloride (5 g.) was dissolved in pyrolidine (50 ml.) with evolution of heat. The reaction mixture was allowed to stand at room temperature overnight and was then poured into dilute hydrochloric acid (350 ml.). The precipitate was collected and the filtrate was extracted with ethyl acetate. The total crude product was crystallised twice from ethanol to give the 4′-pyrolidino-compound (2.65 g., 48%), M.P. 248–253°, [α]$_D$ +319° (c., 1.2 in acetone). (Found: C, 61.0; H, 5.85; N, 3.3; Cl, 8.7. $C_{20}H_{22}ClNO_5$ requires C, 61.3; H, 5.7; N, 3.6; Cl, 9.1%.)

We claim:

1. A compound selected from the group consisting of

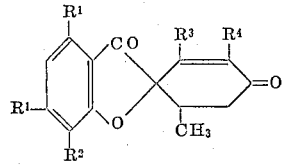

and

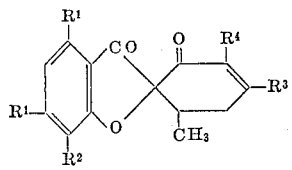

wherein $R^1$ is lower alkoxy, $R^2$ is halo, $R^3$ is selected from the group consisting of chloro and bromo and $R^4$ is selected from the group consisting of hydrogen, lower alkyl, lower alkenyl, benzyl, chloro and bromo.

2. A process for the preparation of at least one enol halide selected from the group consisting of

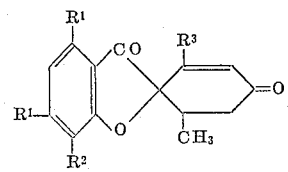

and

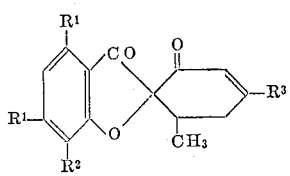

wherein $R^1$ is lower alkoxy, $R^2$ is halo and $R^3$ is selected from the group consisting of chloro and bromo, said process comprising reacting a compound of the formula

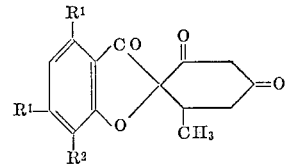

wherein $R^1$ and $R^2$ have the meanings given above with a member selected from the group consisting of phosphorous oxychloride and phosphorous oxybromide.

3. A process according to claim 2 wherein the reaction is effected in the presence of dimethyl formamide as solvent.

4. A process according to claim 2 in which a metal chloride selected from the group consisting of lithium chloride and magnesium chloride is present during the reaction.

5. A process for the preparation of enol halides of the formula

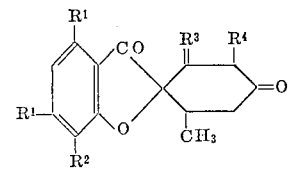

wherein $R^1$ is lower alkoxy, $R^2$ is halo, $R^3$ is selected from the group consisting of chloro and bromo and $R^4$ is selected from the group consisting of lower alkyl, lower alkenyl, benzyl, chloro and bromo, said process comprising reacting a compound of the formula

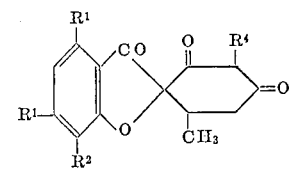

wherein $R^1$, $R^2$, and $R^4$ have the meanings given above with a member selected from the group consisting of phosphorous oxychloride and phosphorous oxybromide.

6. A process according to claim 5 in which a metal chloride selected from the group consisting of lithium chloride and magnesium chloride is present during the reaction.

7. 7,2′-dichloro-4,6-dimethoxy-6′-methylgris-2′-en-3,4′-dione.

8. 7,4′-dichloro-4,6 - dimethoxy - 6′ - methylgris-3′-en-3,2′-dione.

9. 3′-bromo-7,4′-dichloro - 4,6 - dimethoxy - 6′-methylgris-3′-en-3,2-dione.

10. 3′-benzyl-7,4′-dichloro - 4,6 - dimethoxy-6′-methylgris-3′-en-3,2′-dione.

11. 7,3′,4-trichloro-4,6 - dimethoxy-6′-methylgris-3′-en-3,2′-dione.

12. 7-chloro-4,6 - dimethoxy-6′-methyl-4′-phenoxygris-3′-en-3,2′-dione.

13. 7-chloro - 4,6-dimethoxy - 6′-methyl-4′-phenylthio-gris-3′-en-3,2′-dione.

14. 7-chloro-4,6-dimethoxy-6′-methyl-4′-benzylthiogris-3′-en-3,2′-dione.

15. 7-chloro-4,6-dimethoxy - 6′ - methyl-2′-allylthiogris-2′-en-3,4′-dione.

(References on following page)

References Cited in the file of this patent

UNITED STATES PATENTS 2,903,454   Richter et al. _____ Sept. 8, 1959

OTHER REFERENCES

Kosolapoff: Organo Phosphorus Compounds (1950), pages 216–8 and 228–9.

Lowy: An introduction to Organic Chemistry (seventh edition, 1951), page 215.

Grove et al.: J. Chem. Soc. London (1952).

Cram et al.: Organic Chemistry (McGraw-Hill, 1959) page 217.

Crowdy et al.: J. Biochem., volume 72 (1959), pages 241–9.